United States Patent
Bour et al.

(10) Patent No.: US 12,209,512 B2
(45) Date of Patent: Jan. 28, 2025

(54) GROUP OF STATOR VANES

(71) Applicant: SAFRAN AERO BOOSTERS, Herstal (BE)

(72) Inventors: Théo Robin Thomas Bour, Herstal (BE); Christophe Joseph Richard Gillain Remy, Herstal (BE)

(73) Assignee: SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/553,459

(22) PCT Filed: Mar. 24, 2022

(86) PCT No.: PCT/EP2022/057768
§ 371 (c)(1),
(2) Date: Sep. 29, 2023

(87) PCT Pub. No.: WO2022/214323
PCT Pub. Date: Oct. 13, 2022

(65) Prior Publication Data
US 2024/0183279 A1 Jun. 6, 2024

(30) Foreign Application Priority Data

Apr. 6, 2021 (BE) .................... 2021/5260

(51) Int. Cl.
*F01D 9/04* (2006.01)
*F01D 5/14* (2006.01)

(52) U.S. Cl.
CPC ............ *F01D 9/041* (2013.01); *F01D 5/146* (2013.01); *F05D 2230/60* (2013.01); *F05D 2240/80* (2013.01)

(58) Field of Classification Search
CPC ..... F01D 9/00; F01D 9/02; F01D 9/04; F01D 9/041; F01D 9/042; F01D 5/146;
(Continued)

(56) References Cited

U.S. PATENT DOCUMENTS

2015/0247546 A1* 9/2015 Nowaczyk ............... F16F 9/512
188/313
2015/0267547 A1* 9/2015 Guemmer ............. F01D 25/246
415/209.1
(Continued)

FOREIGN PATENT DOCUMENTS

EP 2921714 A1 9/2015
EP 2921715 A1 9/2015
(Continued)

OTHER PUBLICATIONS

International Search Report (English Translation) mailed Jul. 11, 2022, issued in corresponding International Application No. PCT/EP2022/057768, filed Mar. 24, 2022, 2 pages.
(Continued)

*Primary Examiner* — Elton K Wong
(74) *Attorney, Agent, or Firm* — CHRISTENSON O'CONNOR JOHNSON KINDNESS PLLC

(57) ABSTRACT

A group of stator vanes for a row of stator vanes of a stage of a turbomachine compressor, the vanes of the group of stator vanes being close together and affording easy assembly. The group of stator vanes include a platform of a first vane having an aperture for accommodating the head of a second vane, the outer surface of the platform of the first vane being in contact with the inner surface of the platform of the second vane.

14 Claims, 2 Drawing Sheets

(58) Field of Classification Search
CPC ............. F05D 2230/60; F05D 2240/10; F05D 2240/12; F05D 2240/18; F04D 29/542
See application file for complete search history.

(56) References Cited

U.S. PATENT DOCUMENTS

| | | | |
|---|---|---|---|
| 2015/0267548 A1* | 9/2015 | Guemmer | F04D 29/544 |
| | | | 415/209.1 |
| 2018/0021899 A1* | 1/2018 | Koehne | B23P 15/02 |
| | | | 29/889.21 |
| 2020/0088063 A1* | 3/2020 | Dyer | F01D 5/146 |

FOREIGN PATENT DOCUMENTS

| | | |
|---|---|---|
| EP | 2921716 A1 | 9/2015 |
| EP | 3018295 A1 | 5/2016 |
| EP | 3273001 A2 | 1/2018 |

OTHER PUBLICATIONS

Written Opinion mailed Apr. 6, 2021, issued in corresponding International Application No. PCT/EP2022/057768, filed Mar. 24, 2022, 6 pages.

* cited by examiner

GROUP OF STATOR VANES

CROSS-REFERENCE TO RELATED APPLICATIONS

This application is a National Stage of International Application No. PCT/EP2022/057768, filed Mar. 24, 2022, which claims priority to Belgian Patent Application No. 2021/5260, filed Apr. 6, 2021, the entire disclosures of which are hereby incorporated by reference in their entirety for all purposes.

TECHNICAL FIELD

According to a first aspect, the invention relates to a group of stator vanes for a turbomachine. According to a second aspect, the invention relates to a method for assembling a group of stator vanes for a turbomachine.

PRIOR ART

In the double-flow turbomachines, the flowing duct for the primary air flow is separated from that of the secondary air flow by a casing. This casing is generally formed by at least two coaxial shells, an internal shell and an external shell, the internal shell delimiting internally the flowing duct for the primary air flow and the external shell delimiting externally the flowing duct for the secondary air flow.

In order to improve the performance of the bladed elements, and in particular of the compressors, their stator portion can be equipped with a tandem of vanes to offer better performance. A vane tandem whose vanes are very closely spaced or even overlapping offers enhanced performance. However, such vane tandems are often difficult to integrate without affecting the size of the internal shell and external shell delimiting the flowing ducts for the primary and secondary flows.

SUMMARY OF THE INVENTION

According to a first aspect, one of the aims of the present invention is to provide stator vanes for a turbomachine compressor allowing a compact volume and offering an assembling easy, while limiting the complexity of the external shell and the mass of the compressor.

To this end, the inventors propose a group of stator vanes for a row of stator vanes of a stage of a turbomachine compressor, comprising:
  a first vane comprising:
    a first vane platform for mechanically coupling said first vane with an external shell and delimited by:
      an internal surface defining a profile of a duct for a fluid flowing through said row of stator vanes,
      an external surface,
    a first vane blade delimited by a first vane head and a first vane root, the blade being attached to the internal surface of the first vane platform;
  a second vane comprising:
    a second vane platform for mechanically coupling the second vane with an external shell and delimited by:
      an internal surface for coming into contact with the external surface of the first vane platform,
      an external surface,
    a second vane blade delimited by a second vane head and a second vane root, the second vane blade being attached to the internal surface of the second vane platform;
said first vane platform comprising an opening to receive the second vane.

The group of stator vanes of the present invention allows to provide particularly closely spaced vanes, thereby allowing to improve the deflection capability of the stator blading under high aerodynamic load. Thanks to the group of stator vanes of the invention, such an improvement in aerodynamic properties is not achieved at the expense of the circumferential trace of the external shell of the stage of a compressor.

Thanks to the first vane platform comprising an opening for receiving the second vane, the present invention allows to simplify the attachment, in particular because a single attachment is sufficient for two vanes. This allows less machining of the shell and less assembly time. Thanks to the opening in the first vane platform, the second vane platform comes into abutment against the first vane platform and the second vane head is blocked in a circumferential and axial direction by the opening. When the group of vane thus formed is attached to the external shell via the first vane platform, the second platform then comes in abutment against the external shell so that the second vane is radially blocked. Preferably, the opening has a geometry that frames the profile of the second vane blade, which allows it to be inserted without any particular difficulty.

With the group of vane of the invention, it is only necessary to ensure the attachment of the first vane, with the second vane platform being attached by means of the first vane platform. Preferably, the first vane platform is bolted, riveted or welded to the external shell. Thus, thanks to the invention, it is not necessary to attach the second vane platform directly to the external shell, as the invention allows it to be attached by means of the first vane platform, which is made possible by the presence of the opening in the first vane platform.

The present invention also allows to reduce the complexity of the external shell. Overall, it allows the integration of tandem vanes, which offer advantages in terms of aerodynamic objectives, weight and assembly complexity.

The group of vanes of the present invention allows to ensure the solidity of the assembly of a row of stator vanes while respecting an axial overall dimension compatible with reduced distances between stator and rotor stages.

One advantage of the present invention is that it allows the mass of a tandem of stator vanes to be reduced. Another advantage of the present invention is that, thanks to the group of stator vanes of the invention, it is possible to reduce the axial overall dimension and avoid having to add a double rotor and stator stage by means of a single complementary stator.

Preferably, the first vane root is configured to be mechanically coupled with an internal shell of a compressor stage. The second vane root is also configured to be mechanically coupled to the internal shell of a compressor stage.

The first vane blade being attached to the internal surface of the first vane platform means that the blade is secured to the platform by the internal surface of the platform. Attached here refers to the place where the blade and the platform are mechanically connected together, but not to the way in which they are connected. Attached does not necessarily mean that the blade has been attached to the platform, but it also means that the platform and the blade have been machined from a single bloc, or that the platform and the blade have been created using additive manufacturing.

In a preferred embodiment, the turbomachine compressor is an axial compressor and the first vane blade axially overlaps the second vane blade. Preferably, the group of stator vanes is an overlapped tandem of stator vanes.

Preferably, the first vane blade partially overlaps the second vane blade axially. Such an axial overlap allows to improve the aerodynamic properties of a compressor stage compared with a simple row of vanes and improves the compactness.

In the context of this document, axially refers to the axial direction when the group of stator vanes is positioned in an axial compressor; and the circumferential direction refers to the direction of rotation of a row of rotor vanes positioned in such a turbomachine compressor stage.

Preferably, the first vane platform comprises a shoulder delimiting a first segment surrounding the opening and a second segment. Preferably, the second segment has a greater thickness than the first segment. Even more preferably, the difference in thickness between the first and the second segment is equal to the thickness of the second vane platform.

The internal surface of the second vane platform is in contact with the external surface of the first vane platform and the external surface of the second vane platform is configured to come in interaction with an external shell of a compressor stage.

The opening is an aperture between the internal surface of the first vane platform and the external surface of the first vane platform.

Preferably, the aperture is entirely delimited by the second vane platform. Fully delimited means that there are walls around the aperture in an axial direction and in a circumferential direction. As this is an aperture, it is of course free in a radial direction so that the second vane blade can be inserted through this aperture. Thanks to the lateral walls, this aperture allows the second vane to be held securely in the axial and circumferential directions. Thanks to these walls, it is only necessary to hold the second vane relative to the first vane in a radial direction. For example, the opening is a hole between the internal surface and the external surface of the first vane platform. For example, the opening, the aperture or the hole is open only between the internal surface and the external surface of the first vane platform.

In a first embodiment, the first vane is formed in a single piece, preferably the first vane is monobloc. For example, the first vane is machined from a single bloc. For example, the first vane is manufactured using additive manufacturing. Preferably, the second vane is formed in a single piece, more preferably the second vane is monobloc. For example, the second vane is machined from a single bloc. For example, the second vane is manufactured using additive manufacturing.

In a second embodiment, the first vane blade is fitted to the first vane platform. Preferably, the second vane blade is fitted to the second vane platform. For example, the blade is welded to the platform (applies to the first and/or the second vane).

Preferably, the external surface of the first vane platform comprises a bath around the opening. The bath around the opening is configured so that a weld or machining bead between the blade and the second vane platform does not come into contact with the external surface of the first vane platform.

Preferably, the second vane can be mechanically coupled to the first vane by means of centring points and supports on the external shell.

Preferably, the group of stator vanes further comprises a flexible seal between the second vane head and the internal surface of the first vane platform. For example, the flexible seal is of the silicone type. In another embodiment, the group of stator vanes further comprises a flexible seal between the second vane blade and the internal surface of the first vane platform. In all the embodiments, such a flexible seal allows to ensure that a duct between the bladings (first and second vanes) is as smooth as possible. This allows to create a connecting radius between the second vane and the internal surface of the perforated first vane platform, thereby improving the aerodynamic properties of the duct.

The inventors also propose a row of turbomachine stator vanes comprising:
an external shell,
a plurality of stator vane groups according to one of the group of stator vanes embodiments described above,
said plurality of groups of stator vane being attached to the external shell by means of the first vane platform.

The row of stator vanes further comprises, preferably, an internal shell mechanically coupled to the roots of said first and second stator vanes of said plurality of groups of stator vanes.

Preferably, the external shell comprises at least one groove configured to receive at least one group of stator vanes from the plurality of stator vanes. In a further embodiment, the external shell comprises a plurality of grooves, each of the grooves being configured to receive a group of stator vanes from the plurality of stator vanes.

In another embodiment, the external shell is rotated around its entire circumference so as to create a "groove" capable of accommodating a plurality of groups of vanes of the invention. In such an embodiment, the orientation of the second vanes could be defined by the orientation of the lateral faces of the first vanes. The lateral faces extending between the internal and external surfaces of the vane platform and being intended to come into contact with an adjacent vane group platform in said "groove".

The inventors also propose a turbomachine compressor comprising a row of stator vanes according to one of the above-described embodiments. The invention is particularly suited to a high-speed turbomachine compressor, in particular of the type comprising a reducer.

The inventors also propose an aircraft turbomachine comprising a turbomachine compressor as described above.

According to a second aspect of the invention, the inventors propose a method for assembling a group of stator vanes for a row of stator vanes of a turbomachine compressor stage comprising the following steps:
a) providing a first vane comprising:
  a first vane platform for mechanically coupling with an external shell and delimited by:
    an internal surface defining a profile of a duct for a fluid flowing through said row of stator vanes,
    an external surface,
  a first vane blade delimited by a first vane head and a first vane root, said blade being attached to said internal surface of the first vane platform;
  said first vane platform comprising an opening;
b) providing a second vane comprising:
  a second vane platform for mechanically coupling the second vane with an external shell and delimited by
    an internal surface for coming into contact with the external surface of the first vane platform,
    an external surface,
  a second vane blade delimited by a second vane head and a second vane root, the second vane blade being attached to the internal surface of the second vane platform;

c) inserting the second vane into the opening starting from the root of the second vane until the internal surface of the second vane platform abuts the external surface of the first vane platform.

The variants and advantages of the group of stator vanes according to the first aspect of the invention apply to the method for assembling a group of stator vanes according to the second aspect of the invention, mutatis mutandis.

The inventors also propose a method for assembling a row of stator vanes of a turbomachine compressor stage comprising the following steps:

d) providing a group of stator vanes according to the first or the second aspect of the invention, the group of stator vanes comprising attachment means secured to the external surface of the first vane platform;

e) providing an external shell of a compressor stage, the external shell comprising an attachment hole;

f) attaching the group of stator vanes to the external shell by passing the attachment means through the attachment hole and then bolting, riveting or welding the attachment means to the external shell so that the external surface of the first vane platform and the external surface of the second vane platform are in contact with the external shell.

BRIEF DESCRIPTION OF THE FIGURES

These aspects and other aspects of the invention will be clarified in the detailed description of particular embodiments of the invention, reference being made to the drawings of the FIGURES, in which.

The drawings in the FIGURES are not to scale. Generally, similar elements are denoted by similar references in the FIGURES. The presence of reference numbers in the drawings shall not be considered limiting, even when such numbers are indicated in the claims.

DETAILED DESCRIPTION OF SOME EMBODIMENTS OF THE INVENTION

Figure 1:
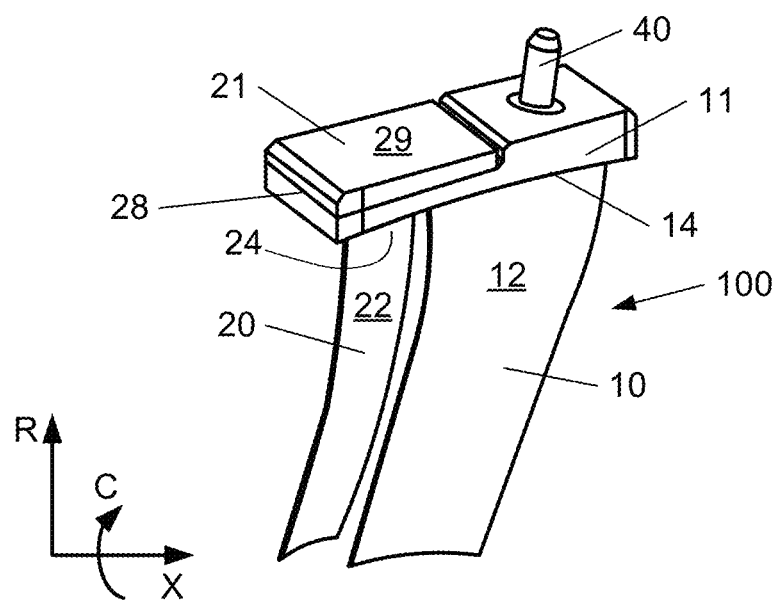
FIG. 1 shows an embodiment of a group of vanes according to the invention.

FIGS. 1 to 4 show an abstract geometric reference frame for quantifying and/or visualising properties of embodiments of the invention. For example, the reference X generally designates the "engine axle" of the aircraft turbomachine. The stages of the compressors and of the turbines of the aircraft turbomachine are generally stacked essentially along this engine axle. The reference frame in FIG. 1 shows the "axial" X, "circumferential" C and "radial" R directions, which correspond preferentially and respectively to directions parallel to the engine axle, essentially circular around the engine axle, and perpendicular to the engine axle. The terms "axially" and "radially" are derived from the terms "axial" and "radial" respectively with a similar preferred meaning. The terms "circumferential" and "radial" preferably refer to a polar coordinate system known to a person skilled in the art in each plane perpendicular to the engine axle.

FIG. 1 shows an example of embodiment of a group of vanes 100 according to the invention. The group of vanes 100 of FIG. 1 comprises a first vane 10 comprising a first vane platform 11 delimited by an internal surface 18 defining a profile of a duct for a fluid flowing through a row of stator vanes of a stage of an axial turbomachine compressor. The first vane platform 11 allows the mechanical coupling with an external shell 60 and is also delimited by an external surface 19. The first vane comprises a first vane blade 12 delimited by a first vane head 14 attached to said internal surface 18 of the first vane platform 11 and a first vane root 15. The first vane root 15 is configured to come in interaction with an internal shell 70 of the row of stator vanes. The first vane platform 11 can be fitted after the first vane 10 has been machined.

The group of vanes 100 in FIG. 1 also shows a second vane 20 comprising a second vane platform 21 allowing for the mechanical coupling with an external shell 60. The second vane platform 21 is delimited by an internal surface 28 for coming into contact with the external surface 19 of the first vane platform 11 and an external surface 29. The second vane comprises a second vane blade 22 delimited by a second vane head 24 and a second vane root 25. The second vane blade 22 is attached to the internal surface 28 of the second vane platform 21. The first vane platform 11 comprises an opening 30 (not shown) to receive the second vane head 24, so as to bring the first vane external surface 19 into contact with said second vane internal surface 28. Thanks to the opening 30 (not shown), the blades of the first 12 and second 22 vanes are particularly close together.

The first vane 10 may be downstream or upstream of the second vane 20.

Figure 2:
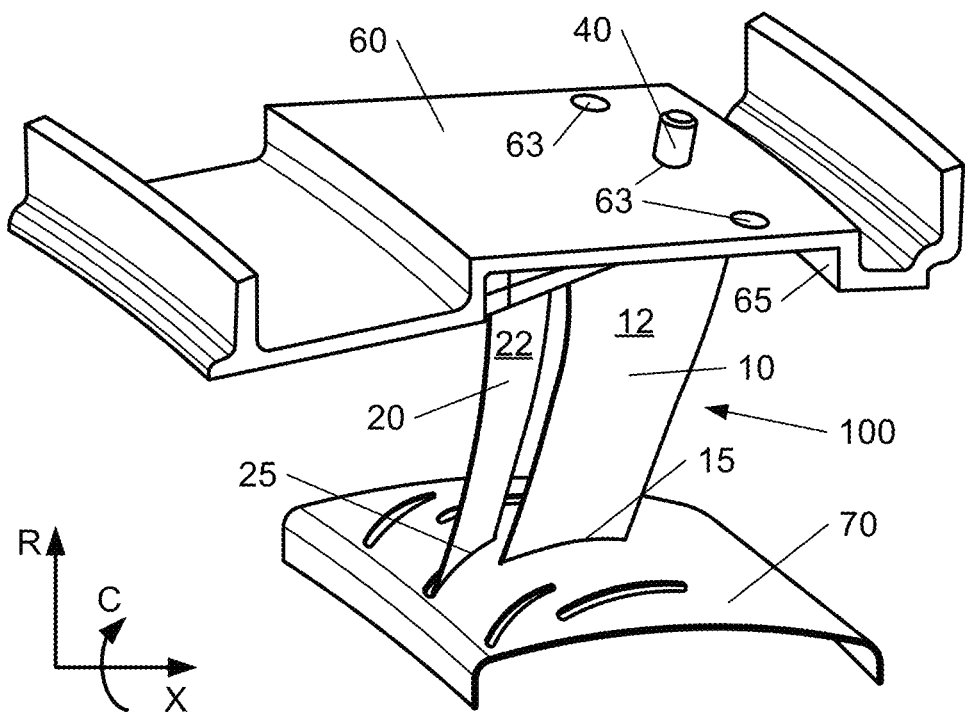
FIG. 2 shows an embodiment of a group of vanes according to the invention positioned between an internal shell and an external shell.

FIG. 2 shows an example of embodiment of a group of vanes 100 according to the invention positioned between an external shell 60 and an internal shell 70. The external shell 60 comprises a circumferential groove 65 to receive the platforms 11, 21 of the group of vanes 100. The external shell 60 comprises an attachment hole 63 for passing attachment means 40 secured to the first vane platform 11. Here, the group of vanes 100 is attached to the external shell 60 of a turbomachine compressor stage by attachment means 40 which, for example, allow the group of vanes 100 to be bolted to the external shell 60. The group of stator vanes 100 shown in FIG. 2 is an overlapped tandem of vanes. This can be attached to the external shell 60 by a single attachment means 40. When the first 10 and second 20 vanes are attached to the external shell 60, a flexible seal (not shown), for example of the silicone type, is applied between the head of the second vane 24 and the internal surface 18 of the first vane platform. Such a flexible seal allow to fill any space between the second vane blade 22 (or the second vane blade head 24) and the lateral walls of the opening 30.

Here, the group of vanes 100 is attached to the external shell 60 of a row of stator vanes of a turbomachine compressor using attachment means 40. The attachment means 40 are inserted into an attachment hole 63 in the external shell 60. For example, the attachment means 40 allow to bolt, rivet or weld the first vane 10 to the external shell 60, thereby allowing to hold the external surface 19 of the first vane platform 11 and the external surface 29 of the second vane platform 21 against the external shell 60. Thanks to the shoulder 190 (shown in FIG. 3) of the first vane platform 11, the external surface 29 of the second vane platform 21 is flush with the external surface 19 of the first vane platform. Such a flush arrangement allows to ensure a good contact between the external surfaces 19, 29 of the first 11 and second 21 vane platforms respectively and the external shell 60. Such a contact allows to ensure that the stator vane assembly 100 is rigid with the external shell 60.

Figure 3:
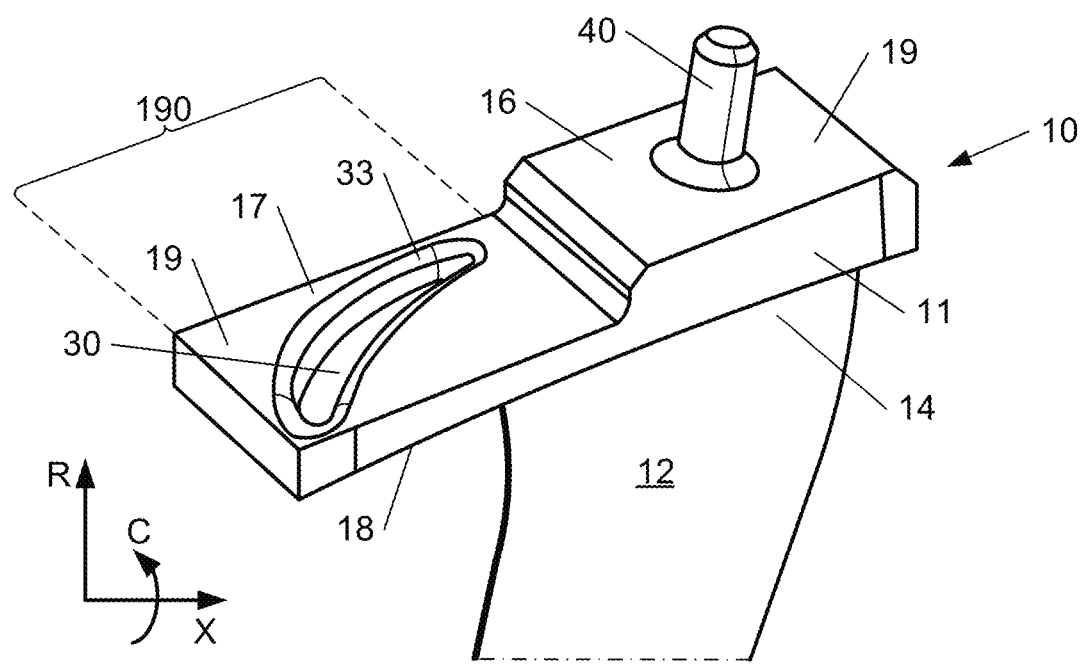
FIG. 3 shows a close-up view of a first vane platform.

FIG. 3 shows an example of embodiment of the first vane 10. As described in FIG. 1, the first vane 10 comprises a first vane platform 11 comprising an opening 30 for receiving the head of a second vane 24, the external surface 19 of the first vane then being in contact with said internal surface 28 of the second vane. The first vane platform 11 comprises a shoulder 190 defining a first segment 17 surrounding said opening 30. The first vane platform 21 also defines a second segment 16 having a greater thickness than the first segment 17. The external surface 19 of the first vane platform 11 refers to both the external surface of the first segment 17 and of the second segment 16. Attachment means 40 are positioned on the external surface 19 of the second segment of the first vane platform. These attachment means 40 allow the first vane 10 to be attached to an external shell 60 of a compressor stage.

The opening 30 is an aperture between the internal surface 28 of the first vane platform and the external surface 29 of the first vane platform. The opening 30 or the aperture is entirely delimited axially and in a circumferential direction C by said second vane platform 21. Axially means, when the group of vanes is attached in an axial compressor stator stage, the direction defined by the axis of the axial compressor. In FIG. 3, the opening 30 is a hole between the internal surface 18 and the external surface 19 of the first vane platform. The aperture 30, the opening or the hole is open only between the internal surface 18 and the external surface 19 of the first vane platform. Such a hole is made by milling, for example. The external surface 19 of the first vane platform 11 comprises a bath 33 around the opening 30.

Figure 4:
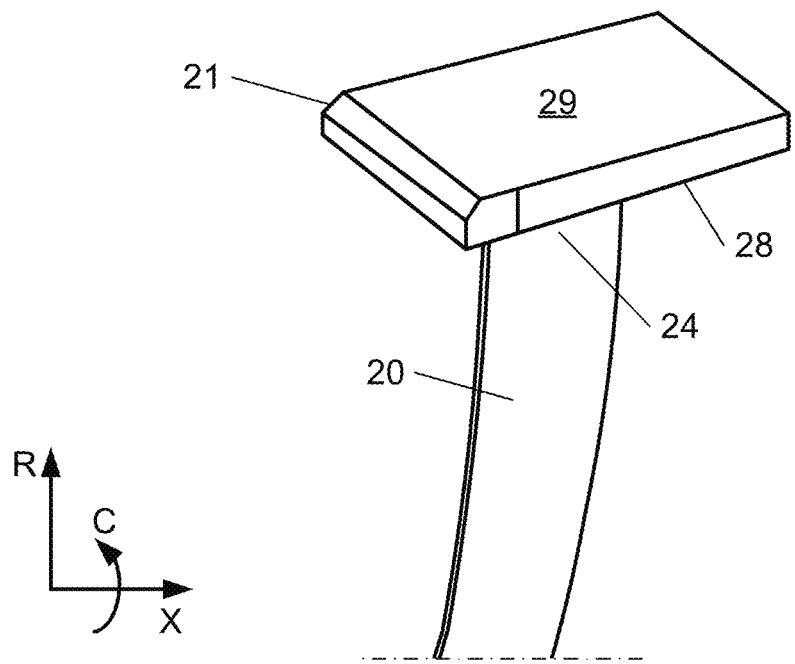
FIG. 4 shows a close-up view of a second vane platform.

FIG. 4 shows an example of embodiment of the second vane 20. As described in FIG. 1, the second vane 20 comprises a platform 21 delimited by an internal surface 28 for coming into contact with the external surface 19 of the first vane platform 11 and an external surface 29. The second vane 20 also comprises a second vane blade 22 delimited by a second vane head 24 and a second vane root 25, the second vane blade 22 being attached to the internal surface 28 of the second vane platform 21. The second vane root 25 (not shown) is configured to come in interaction with the internal shell 70 of a row of stator vanes.

The present invention has been described above in connection with specific embodiments, which are illustrative and should not be considered limiting. In general, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

In summary, the invention can also be described as follows.

A group of stator vanes 100 for a row of stator vanes of a stage of a turbomachine compressor, the vanes of the group of stator vanes 100 being close together and offering an easy assembly. The group of stator vanes 100 comprising a platform 11 of the first vane 10 comprising an opening 30 for receiving the head 24 of the second vane 20, the external surface 19 of the first vane platform 11 being in contact with the internal surface 28 of the second vane platform 21.

The invention claimed is:

1. A group of stator vanes for a row of stator vanes of a stage of a turbomachine compressor, the group of stator vanes comprising:
   a first vane comprising:
      a first vane platform for mechanically coupling the first vane with an external shell and delimited by:
         an internal surface defining a profile of a duct for a fluid flowing through the row of stator vanes; and
         an external surface; and
      a first vane blade delimited by a first vane head and a first vane root, the first vane blade being attached to the internal surface of the first vane platform; and
   a second vane comprising:
      a second vane platform for mechanically coupling the second vane with an external shell and delimited by:
         an internal surface for coming into contact with the external surface of the first vane platform; and
         an external surface; and
      a second vane blade delimited by a second vane head and a second vane root, the second vane blade being attached to the internal surface of the second vane platform,
   wherein the first vane platform has an opening for receiving the second vane, and wherein the opening is an aperture between the internal surface of the first vane platform and the external surface of the first vane platform.

2. The group of stator vanes according to claim 1, wherein the turbomachine compressor is an axial compressor, and wherein the first vane blade overlaps the second vane blade of the second vane axially, and wherein the group of stator vanes is an overlapped tandem of stator vanes.

3. The group of stator vanes according to claim 1, wherein the first vane platform comprises a shoulder delimiting a first segment surrounding the opening and a second segment.

4. The group of stator vanes according to claim 1, wherein the aperture is entirely delimited by the second vane platform.

5. The group of stator vanes according to claim 1, wherein the first vane is formed in a single piece as a monobloc.

6. The group of stator vanes according to claim 1, wherein the first vane blade is fitted to the first vane platform.

7. The group of stator vanes according to claim 1, further comprising a flexible seal between the second vane head and the internal surface of the first vane platform.

8. A turbomachine stator row, comprising:
   an external shell; and
   a plurality of groups of stator vanes according to claim 1, wherein the plurality of groups of stator vanes are attached to the external shell by the first vane platform.

9. The turbomachine stator row according to claim 8, further comprising an internal shell mechanically coupled to the roots of the first and second stator vanes of the plurality of groups of stator vanes.

10. The turbomachine stator row according to claim 8, wherein the external shell comprises at least one groove configured to receive at least one group of stator vanes of the plurality of groups of stator vanes.

11. A turbomachine compressor comprising the turbomachine stator row according to claim 9.

12. An aircraft turbomachine comprising a turbomachine compressor according to claim 11.

13. A method for assembling a group of stator vanes for a stator vane row of a turbomachine compressor stage, the method comprising the following steps:
(a) providing a first vane comprising:
a first vane platform for mechanically coupling with an external shell and delimited by:
an internal surface defining a profile of a duct for a fluid flowing through the row of stator vanes; and
an external surface; and
a first vane blade delimited by a first vane head and a first vane root, the first vane blade being attached to the internal surface of the first vane platform, the first vane platform having an opening;
(b) providing a second vane comprising:
a second vane platform for mechanically coupling the second vane with an external shell and delimited by:
an internal surface for coming into contact with the external surface of the first vane platform; and
an external surface; and
a second vane blade delimited by a second vane head and a second vane root, the second vane blade being attached to the internal surface of the second vane platform,
wherein the opening is an aperture between the internal surface of the first vane platform and the external surface of the first vane platform; and
(c) inserting the second vane into the opening starting with the second vane root until the internal surface of the second vane platform abuts the external surface of the first vane platform.

14. The method according to claim 13, further comprising the following steps:
(d) carrying out the steps (a) through (c) to assemble a group of stator vanes, the group of stator vanes having attachment means secured to the external surface of the first vane platform;
(e) providing an external shell of a compressor stage, the external shell having an attachment hole; and
(f) attaching the group of stator vanes to the external shell by passing the attachment means through the attachment hole and then bolting, riveting, or welding the attachment means to the external shell so that the external surface of the first vane platform and the external surface of the second vane platform are in contact with the external shell.

* * * * *

UNITED STATES PATENT AND TRADEMARK OFFICE
CERTIFICATE OF CORRECTION

Page 1 of 1

PATENT NO. : 12,209,512 B2
APPLICATION NO. : 18/553459
DATED : January 28, 2025
INVENTOR(S) : Théo Robin Thomas Bour et al.

It is certified that error appears in the above-identified patent and that said Letters Patent is hereby corrected as shown below:

On the Title Page

| Column | Line | |
|---|---|---|
| 2 | 1 | item [74], in "Attorney, Agent, or Firm" delete "CHRISTENSON" and insert -- CHRISTENSEN -- |

In the Claims

| Column | Line | |
|---|---|---|
| 8 | 65 | Claim 11, delete "claim 9." and insert -- claim 8. -- |

Signed and Sealed this
Twenty-third Day of December, 2025

John A. Squires
*Director of the United States Patent and Trademark Office*